United States Patent [19]

Kameda et al.

[11] Patent Number: 5,450,921
[45] Date of Patent: Sep. 19, 1995

[54] FOUR-WHEEL-DRIVE POWER TRANSMISSION APPARATUS

[75] Inventors: Osamu Kameda; Norihide Urabayashi, both of Hiroshima, Japan

[73] Assignee: Mazda Motor Corporation, Hiroshima, Japan

[21] Appl. No.: 54,273

[22] Filed: Apr. 30, 1993

[30] Foreign Application Priority Data

Apr. 30, 1992 [JP] Japan .................. 4-111026

[51] Int. Cl.⁶ ........................ B60K 5/04; B60K 17/342
[52] U.S. Cl. ........................ 180/297; 475/206
[58] Field of Search ............ 180/233, 247, 248, 297; 475/206, 230

[56] References Cited

U.S. PATENT DOCUMENTS

| | | | |
|---|---|---|---|
| 4,449,604 | 5/1984 | Suzuki | 180/297 |
| 4,744,435 | 5/1988 | Schnurer | 180/233 |
| 4,909,371 | 3/1990 | Okamoto et al. | 180/248 |
| 5,197,565 | 3/1993 | Sado | 475/206 |

FOREIGN PATENT DOCUMENTS 60-18656 1/1985 Japan .

*Primary Examiner*—John J. Vrablik

[57] ABSTRACT

In a power transmission apparatus of four-wheel-drive vehicle, driving noise between the first bevel gear fixed on the transfer shaft and the second bevel gear fixed on the axle shaft is reduced in each bevel gear comprising the power transmission and restrictions are avoided when the deceleration ratio of the transfer shaft and the line are set. Power transmission having clutch for variably controlling driving torque division with respect to the wheels not being constantly driven, an axle shaft for constantly driving the axle shaft by obtaining the driving force from the output shaft of the transmission.

18 Claims, 13 Drawing Sheets

FIG. 3

| | CHAIN | | FRONT | | | REAR | | | TOTAL GEAR RATIO |
|---|---|---|---|---|---|---|---|---|---|
| | $Z_1/Z_2$ | $i_1$ | $Z_P/Z_F$ | $i_2$ | RING GEAR SIZE | $Z_R/Z_P$ | $i_3$ | RING GEAR SIZE | ($i_1 \times i_2 \times i_3$) |
| (I) | 30/30 | 1.000 | 11/43 | 0.252 $1/i_2$ =3.909 | LARGE | 43/11 | 3.909 | LARGE | 30/30 × 11/43 × 43/11 = 1.000 |
| (II) | ← | ← | 11/37 | 0.297 $1/i_2$ =3.363 | ← | 37/11 | 3.363 | ← | 30/30 × 11/37 × 37/11 = 1.000 |
| (III) | 27/30 | 0.900 | 11/36 | 0.305 $1/i_2$ =3.272 | SMALL | 40/11 | 3.636 | ← | 27/30 × 11/36 × 40/11 = 1.000 |
| (IV) | 25/30 | 0.833 | 11/35 | 0.314 $1/i_2$ =3.181 | ← | 42/11 | 3.818 | ← | 25/30 × 11/35 × 42/11 = 1.000 |
| (V) | 24/28 | 0.857 | 11/36 | 0.305 $1/i_2$ =3.272 | ← | ← | ← | ← | 24/28 × 11/36 × 42/11 = 1.000 |

FOUR-WHEEL-DRIVE POWER TRANSMISSION APPARATUS

BACKGROUND OF THE INVENTION

1. Field of the Invention

The present invention relates to a power transmission apparatus for a four-wheel-drive vehicle.

2. Description of the Related Art

In a conventional transverse engine (an engine wherein the pistons are arranged perpendicular to the body of the vehicle), as disclosed in Japanese Patent Provisional Publication No. 60-18656, one-shaft type which transmits driving force from a first shaft is well known. In this type of engine, however, the first shaft is provided at a rather high position with respect to the vehicle height. Accordingly, a problem arises in a layout where a floor tunnel covering a propeller shaft connecting to a second shaft is also provided at the high position.

In light of the above drawback, a two-shaft-type four-wheel-drive power transmission apparatus which can variably control division of drive torque for the rear wheels is suggested. According to Japanese Patent Provisional Publication No. 62-50235, it is disclosed that the front wheels are constantly driven by the transverse engine in a vehicle front and a clutch is provided in the rear-wheel drive transmission system.

The construction is described with reference to the figures. FIG. 10 is a partial plane based on the figure disclosed in the above Patent Provisional Publication. In the figure, a clutch means is comprised of an oil clutch and controlled by oil pressure. A transmission gear 2 is fixed so as to be arranged substantially in-line with respect to the transverse engine 1 indicated by a two-dot chain line in the figure. A final ring gear 5 is engaged with a pinion gear 4 (indicated by a broken line) which is an output shaft of the transmission gear 2. The final ring gear 5 is fixed on a peripheral surface portion of a front differential gear 6. A first axle shaft 7 for driving the front wheels through the front differential gear 6 is rotatably supported by bearing means indicated by the notations Δ and ∇. The first axle shaft 7 connects with the front drive shafts 8 which constantly drive the front wheels through a universal coupling. With the above-described construction, a system called a FF drive (Front-engine Front-drive) system which constantly drives the front wheels is formed.

In order to variably control division of the drive torque of the rear wheels, a transfer gear 25 fixed to the transfer shaft 12, which is arranged in parallel to the first axle shaft 7, is engaged with the final ring gear 5 at the position which is the opposite to the pinion gear 4. Accordingly, the torque of the engine 1 is transmitted to the transfer shaft 12. On the other hand, the drive-force transmission to a propeller shaft 15 is performed by transforming the direction of the driving force approximately 90 degrees by a front hypoid pinion gear 14 which is engaged with a front hypoid ring gear 130 fixed on the transfer shaft 12, and the drive-force transmission is further performed to each of rear drive shafts 22 through a rear differential gear 19 for the rear-wheel drive.

The power transmission apparatus of the four-wheel drive having the following constitution is also suggested. A clutch 16 which is operated by oil pressure is provided on the transfer shaft 12. An oil pump 101 which generates a predetermined oil pressure and a motor 102 are connected to the clutch 16 and controlled by a controller 100 according to vehicle speed, four-wheel-drive selection, and accelerator opening. Accordingly, in addition to the front wheels, the rear wheels are actively controlled.

In the conventional two-shaft type four-wheel drive (the first axle shaft 7 and transfer shaft 12 are provided), in order to lower the floor, driving-force transmission to the propeller shaft 15 is performed by transforming the driving-force direction approximately 90 degree by the front hypoid pinion gear 14 which is engaged with the front hypoid ring gear 130 fixed on the transfer shaft 12. The power transmission to each of the rear drive shafts is further performed through the rear differential gear for the rear-wheel drive. In this construction, the front hypoid ring gear 14 has a reversing tooth surface with respect to the rear hypoid ring gear 18.

FIG. 11 is an external view showing the state where the rear hypoid ring gear 18 and the hypoid pinion gear 17 which are incorporated in the rear differential gear 19 are engaged, and it is shown in order to explain the above reverse-rotation tooth surface. As shown in FIG. 11, a tooth portion 18t of the rear hypoid ring gear 18 is a helical gear which is twisted to the right direction. The tooth portion 18t is driven to the normal-rotation direction indicated by a solid line and the reverse-rotation direction indicated by a broken line with a center line CL3 indicated by a dashed line. A tooth portion 17t of the rear hypoid pinion gear 17 is also a helical gear which is twisted to the left direction. The tooth portion 17t of the rear hypoid pinion gear 17 has a center line CL2 which is shifted in the distance F from the center line CL3 of the rear hypoid ring gear 18. When the pinion shaft 17a fixing the rear hypoid pinion gear 17 on its one end is driven to either the normal-rotation direction or the reverse-rotation direction, the tooth portion 17t is smoothly abutted against the tooth portion 18t and power transmission is performed. Accordingly, the normal-direction tooth surface is used for the tooth portions 17t and 18t because it is advantageous for the load in the normal-rotation direction which is caused by high frequency of usage.

That is, as shown in FIG. 12 which is, a vertical sectional view of FIG. 11 at the XII—XII line the tooth portion 18t of the hypoid ring gear 18 forms a right tooth surface 18c and left tooth surface 18b comprising a part of an involute curve. The inclined angle of the left tooth surface 18b with respect to the base of the hypoid ring gear 18 is set to a value which is smaller than that of the right tooth surface 18c. Both the right tooth surface 17b and the left tooth surface 17c of the tooth portion 17t of the hypoid pinion gear 17 are abutting against the right tooth surface 18b and right tooth surface 18c, and the driving force of the hypoid pinion gear 17 is transmitted. When the hypoid pinion gear 17 is forwarded (rotated in the normal-rotation direction), the left tooth surface 18b of the rear hypoid pinion gear 18 and the right tooth surface 17b of the rear hypoid pinion gear 17 are abutted, while an abutting force K1 is received at the left tooth surface 18b. On the other hand, when the hypoid pinion gear 17 is reversed, the right-tooth surface 18c and left-tooth surface 17c are contact, and an abutting force K2 is received at the right tooth surface 18c. As the left tooth surface 18b has a smaller inclined angle, it can reserve more strength. Accordingly, the left tooth surface 18b is used for the forwarding side, while the right tooth surface 18c having a large inclined angle is used for the engine-brake side for reversing.

On the other hand, the tooth surface of the front hypoid ring gear 130 (refer to FIG. 10) cannot transmit the torque of the transfer shaft 12 to the propeller shaft 15 which rotates in the normal-rotation direction, if it is arranged so as to face the same direction as that of the rear hypoid ring gear 18. Accordingly, the rear hypoid ring gear 18 or an equivalent gear cannot be used. Therefore, the hypoid ring gear 130 using the right tooth surface 18c for the normal-rotation direction is processed, and this is used for the front hypoid ring gear and called as a hypoid ring gear having a reverse tooth surface.

However, in a gear transmission type such as the above two-shaft type, the direction of rotation of the transfer shaft and that of the second shaft are opposite to each other. Accordingly, since the ring gear and pinion gear of the bevel gear comprising a gear set both face in the same direction, say the right side, one becomes a normal-rotation tooth surface, while the other is a reverse-rotation tooth surface.

Accordingly, a three-shaft type is suggested. That is, an idle shaft is provided between the first shaft and transmission shaft. The direction of rotation of the transfer shaft is arranged to be the same as that of the second shaft, and both use the normal-rotation tooth surface.

For example, a diagram of FIG. 13 is disclosed in Japanese Patent Provisional Publication No. 63-287632. In this figure, the idle shaft 11 is provided between the first axle shaft 7 and transfer shaft 12. In this way, it is arranged so that only the normal-rotation tooth surface can be used.

SUMMARY OF THE INVENTION

However, according to the above three-shaft type, since an extra shaft is used, the distance P between the first axle shaft 7 and transfer shaft 12 increases as shown in FIG. 13 and the structure is extended in a front-rear direction. The problem is that positioning possibility decreases, vibration is easily caused, and rigidity is decreased. That is, when a driving force for forwarding is applied, each shaft is rotated in the direction indicated by the arrow. However, at the engaging point, repulsive force is generated in the direction which is perpendicular to the engaging face. This repulsive force is also generated on the engaging face of the hypoid gear, while torque (moment M) is generated in the transfer shaft because the gear engaging with the idle gear and the hypoid gear is usually arranged in off-set. As the off-set amount increases, the moment M becomes larger even if the repulsive force is small. Accordingly, the distance between the gears changes, and noise and abrasion are generated. In order to solve these problems, consideration can be given to improve the supporting rigidity of the bearing. In this case, however, rotational vibration is generated due to the torsion of the shaft.

In the two-shaft type shown in FIG. 10, since a driving force is inputted to the transfer shaft 12 via the final ring gear 5 and the clutch 16 is provided on this transfer shaft 12, the gear ratio of the final ring gear 5 to the transfer gear 25 needs to be set a restriction in the number of the teeth and the diameter of the final ring gear 5. Thus, the gear ratio to decelerate the transfer shaft is restricted. Particularly, if the diameter of the final ring gear 5 becomes larger, problems arise in that the minimum road clearance becomes smaller and the gear ratio is further restricted.

Furthermore, as a result of the above construction, the clutch must work on the transfer shaft which is rotating at a small rotation rate. Accordingly, a larger clutch torque operation is needed for the clutch and a clutch having a large capacity is used, resulting in enlarging the clutch in size.

On the other hand, when the transfer gear 25 is engaged with the final ring rear 5, the front hypoid ring gear 130 having a reverse-rotation tooth surface needs to be used for the transfer shaft 12. However, as described earlier, this reverse-rotation tooth surface has a large slope angle and is weak in rigidity. Therefore, a carbo-nitriding processing or shot peening processing is needed for the tooth surface, thus resulting in cost increase. Furthermore, the hypoid ring gear is tuned up so as to use the normal-rotation tooth surface. If the reverse-rotation tooth surface is used, noise and vibration are generated. Therefore, a counterplan is needed for the noise and vibration, resulting in further cost increase.

In the light of the above drawbacks, it is an object of the present invention to provide a power transmission apparatus for a four-wheel drive vehicle capable of eliminating the driving noise between each bevel gear, a first bevel gear fixed on the transfer shaft and a second bevel gear fixed on the axle shaft, and not being restricted when the decelerating ratio of the transfer shaft is set.

It is another object of the present invention to provide a power transmission apparatus for a four-wheel drive vehicle capable of miniaturizing the clutch means and suppressing the cost by setting the decelerating ratio of each bevel gear comprising the power transmission means.

According to the present invention, the foregoing object is attained by a power transmission apparatus for four-wheel-drive vehicle comprising: a transverse engine provided in the front or rear of a vehicle as well as the output shaft of the engine is extensively provided to the direction of the vehicle width; a transmission gear provided substantially in-line with the transverse engine so that the output shaft of the transmission is substantially parallel to the output shaft of the engine; power transmission means for being provided with respect to the transmission gear, constantly driving either front wheels or rear wheels, and having clutch means for variably controlling driving torque division for the wheels not being constantly driven; an axle shaft for constantly driving the wheels by obtaining a driving force from the output shaft of the transmission as well as being provided in parallel to the output shaft of the transmission; a transfer shaft being provided in parallel to the axle shaft; power transmission means for performing power transmission so that the transfer shaft and axle shaft will have the same direction of rotation; a first ring bevel gear fixed on the transfer shaft; a first pinion bevel gear engaged with the first ring bevel gear; a propeller shaft, one end connecting to the first pinion bevel gear and the other end connecting to a second pinion bevel gear; and a second ring bevel gear having the tooth surface facing to the tooth surface of the first ring bevel gear as well as engaging with the second pinion bevel gear. Accordingly, it is operated to prevent the generation of vibration noise in a manner such that the first ring bevel gear fixed on the transfer shaft comprising the power transmission means and second ring bevel gear can use the normal-rotation tooth face.

Preferably, the power transmission apparatus for four-wheel-drive vehicle comprises: a transverse engine provided in the front of a vehicle as well as the output shaft of the engine is extensively provided in the direction of the vehicle width; a transmission gear provided substantially in-line with the transverse engine so that the output shaft of the transmission is substantially parallel to the output shaft of the engine; power transmission means for providing with respect to the transmission gear, constantly driving the front wheels, and having clutch means for variably controlling driving torque division for the rear wheels not being constantly driven; a first axle shaft for constantly driving the front wheels by obtaining a driving force from the output shaft of the transmission as well as being provided in parallel to the output shaft of the transmission; a transfer shaft provided in parallel to the axle shaft; power transmission means for performing power transmission so as to be comprised of the first sprocket fixed on the transfer shaft, the second sprocket fixed on the axle shaft, and the chain stretched between the first sprocket and second sprocket; a first hypoid ring bevel gear fixed on the transfer shaft; a first hypoid pinion bevel gear which is engaged with the first hypoid ring bevel gear; a propeller shaft, one end connecting to the first hypoid pinion bevel gear and the other end connecting to a second hypoid pinion bevel gear; and a second hypoid ring bevel gear having the tooth surface facing to the tooth surface of the first hypoid ring bevel gear as well as engaging with the second hypoid pinion bevel gear. Accordingly, it is operated to prevent the generation of vibration noise in a manner such that the first ring bevel gear fixed on the transfer shaft comprising the power transmission means and second ring bevel gear can use the normal-rotation tooth face.

More preferably, the power transmission apparatus for four-wheel-drive vehicle comprising: a transverse engine provided in the rear of a vehicle as well as the output shaft of the engine is extensively provided in the direction of the vehicle width; a transmission gear provided substantially in-line with the transverse engine so that the output shaft of the transmission is substantially parallel to the output shaft of the engine; power transmission means for being provided with respect to the transmission gear, constantly driving the rear wheels, and having clutch means for variably controlling driving torque division to the front wheels not being driven; a first axle shaft for constantly driving the front wheels by obtaining a driving force from the output shaft of the transmission was well as being provided in parallel to the output shaft of the transmission; a transfer shaft for being provided in parallel to the first axle shaft; power transmission means for performing power transmission so that the transfer shaft and axle shaft will have the same direction of rotation; a first ring bevel gear fixed on the transfer shaft; a first pinion bevel gear which is engaged with the first ring bevel gear; a propeller shaft, one end connecting to the first pinion bevel gear and the other end connecting to a second pinion bevel gear; and a second ring bevel gear having the tooth surface facing to the tooth surface of the first ring bevel gear as well as engaging with the second pinion bevel gear. Accordingly, it is operated to prevent the generation of vibration noise as well as the cost increase in a manner such that the deceleration ratio can be arbitrary determined without the restriction from the transfer shaft by the power transmission means connecting the transfer shaft and the first axle shaft, a road clearance is guaranteed, the capacity of the clutch is reduced, and the normal-rotation tooth surface of the hypoid ring bevel gear can be used for the first and hypoid ring bevel gears.

Preferably, maintainability and installability of the clutch means are improved by providing the clutch means in a predetermined portion of the power transmission means. Furthermore, the oil pressure resource for the clutch operation is shared with the automatic transmission gear and response of the clutch operation is improved. Furthermore, the rigidity of the vehicle side is assured for installing the clutch means, the maintainability and installability of the clutch means are improved, and the weight balance between the front and rear of the power transmission gear is improved. Still further, it is so arranged that heat source such as an exhaust pipe will not effect the clutch means by providing the clutch means apart from the transverse engine further than the chain type power transmission means provided on the transfer shaft. Still further, the power transmission apparatus can be freely provided in a left-handle four-wheel-drive vehicle by providing the clutch means in the transverse engine side so as to be adjacent to the ring gear provided on the transfer shaft.

Further objects, features and advantages of the present invention will become apparent from the following detailed description of embodiments of the present invention with reference to the accompanying drawings.

BRIEF DESCRIPTION OF THE DRAWINGS

FIG. 3 is a table of the combination of the number of teeth making a final gear ratio "1" of the rear wheels;

DESCRIPTION OF THE PREFERRED EMBODIMENTS

Preferred embodiments of the present invention will now be described in detail in accordance with the accompanying drawings.

Figure 1:
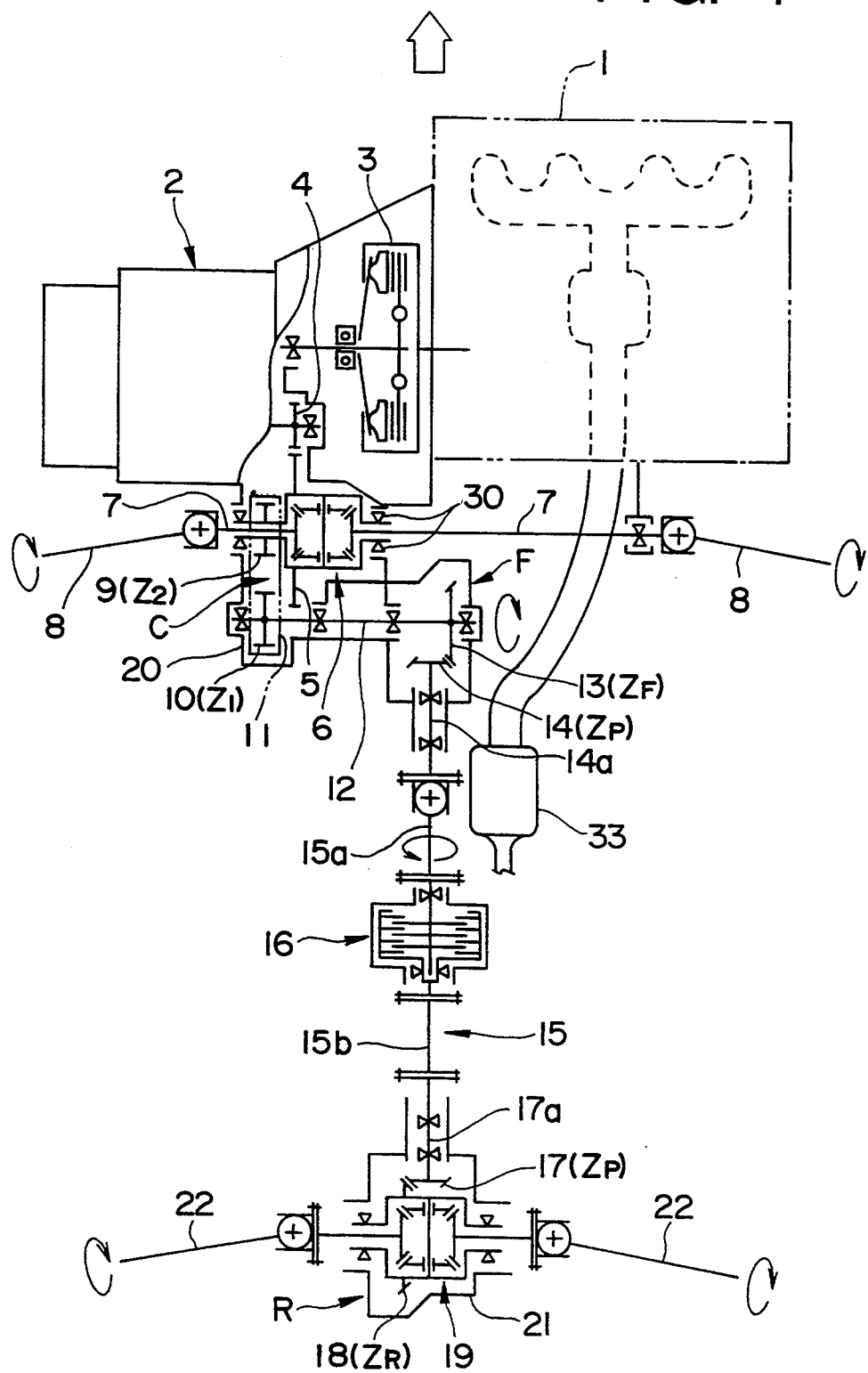
FIG. 1 is a skeleton of the power transmission apparatus of a four-wheel-drive vehicle of a first embodiment.

FIG. 1 is a skeleton of the power transmission apparatus of the four-wheel-drive vehicle of the first embodiment. This constitution is preferable to a driving torque division variable type. In FIG. 1, a transverse engine provided in a vehicle front is an in-line, flat opposed type or V-type engine. The output shaft is substantially perpendicular to the forwarding direction of the vehicle. The engine 1 is an in-line, flat opposed, or V-type engine which is provided horizontally in a vehicle front. The output shaft is substantially perpendicular to the forwarding direction of the vehicle. The basic constitution is that a clutch, which constantly drives the front wheels and variably controls the rear-wheel driving-force torque division, is provided in connection with the rear-wheel drive transmission system.

In FIG. 1, a manual or automatic transmission gear 2 is mounted so as to be arranged in-line with respect to the transverse engine 1 indicated by a two-dot line. A final ring gear 5 is engaged with a pinion gear 4 (indicated by a break line) which is the output shaft of the transmission 2. The final ring gear 5 is fixed on a peripheral surface portion of a front differential gear 6. A pair of the first shafts 7 for driving the front wheels through the front differential gear 6 is rotatably supported by bearing means indicated by the notations $\Delta$ and $\nabla$. The first shafts 7 are connected with the front drive shafts 8 which constantly drive the front wheels (not shown) through a universal coupling. With the above construction, a FF (Front-engine Front-drive) system which constantly drives the front wheels is formed.

Next, the constitution of the power transmission system which variably controls the rear-wheel driving-torque division is described. A second sprocket 10 is fixed on the left side of the transfer shaft 12 which is rotatably supported and arranged in parallel to the first axle shaft 7. On the other hand, a first sprocket 9 is fixed on the peripheral surface portion of a front differential gear 6. A chain 11 indicated by a chain double-dashed line is stretched between the sprockets and it is possible that the driving force from the pinion gear 4 is transmitted so as to be in the same rotational direction as that of the first axle shaft 7.

The front hypoid ring gear 13 is fixed on the right side of the transfer shaft 12 so as to face the toothed surface of the rear-wheel hypoid ring gear 18 which is described later. The front hypoid ring gear 13 is engaged with the front hypoid pinion gear 14. The driving force of the transfer shaft 12 is transmitted to the propeller shaft 15 by transforming the direction of driving force of the transfer shaft 12 for approximately 90 degrees, and the power transmission to each rear-wheel drive shaft. 22 is performed through the rear differential gear 19 for the rear-wheel drive. The propeller shaft 15 comprises a front shaft 15a and rear shaft 15b which are connected by a universal coupling as shown in FIG. 1. The clutch 16, which is turned on/off by oil pressure or magnetic force operation, is provided at approximately the center of the propeller shaft 15. It is arranged so as to control the clutch 16 according to vehicle speed, four-wheel-drive selection, and accelerator opening. Accordingly, both the rear wheels and the front wheels are actively controlled.

Figure 11:
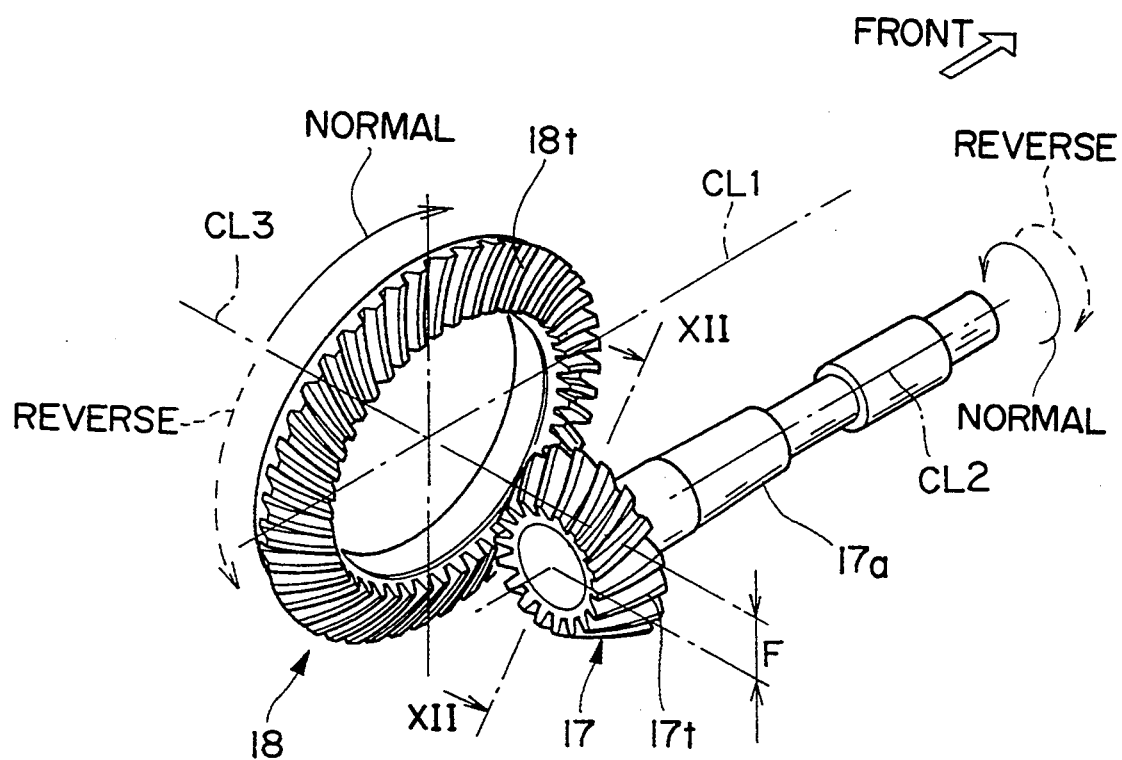
FIG. 11 is an external view showing the state where the rear hypoid ring gear and rear hypoid pinion gear are engaged.
Figure 12:
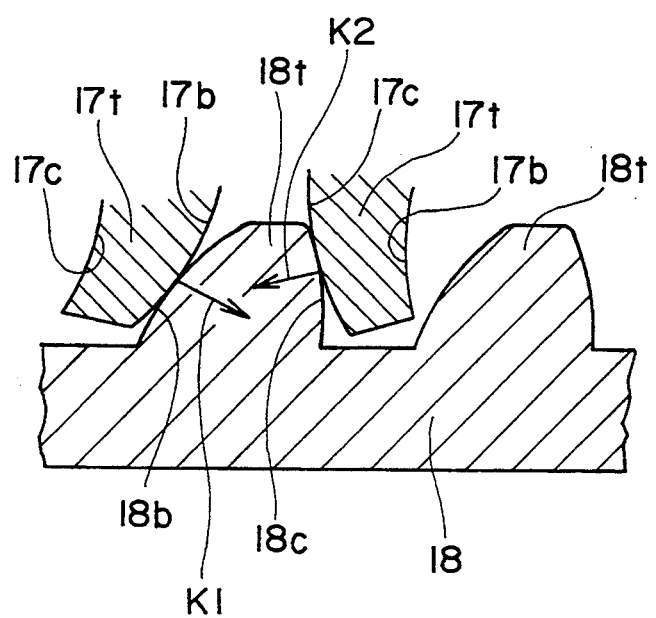
FIG. 12 is a sectional view of FIG. 11 at the XII—XII line.
Figure 13:
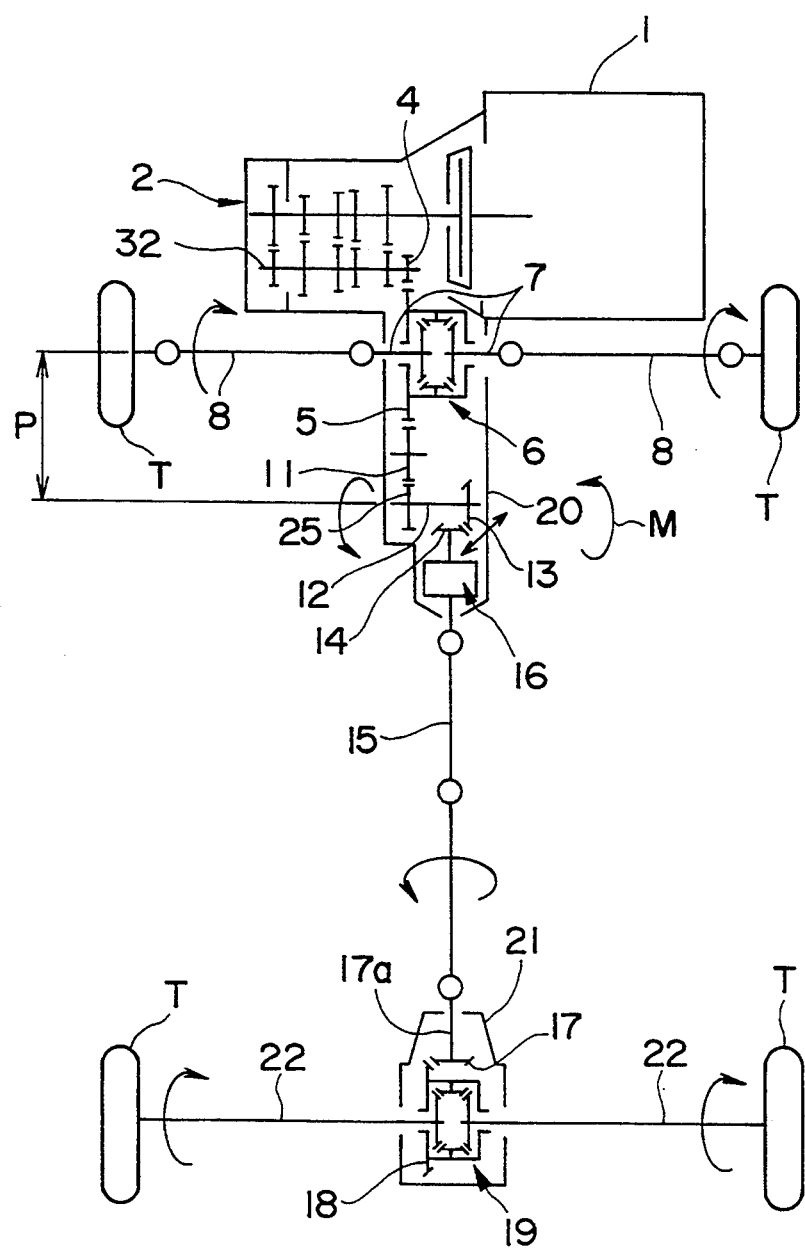
FIG. 13 also shows the prior art and a view of the conventional constitution disclosed in the Japanese Patent Provisional Publication.

The rear hypoid pinion gear 17 is connected to the rear end of the propeller shaft 15. The rear hypoid pinion gear 17 is engaged with the rear hypoid ring gear 18 perpendicularly. As shown in FIG. 11, a toothed portion 18t of the rear hypoid ring gear 18 is a helical gear which is twisted to the right direction. A toothed portion 17t of the rear hypoid ring gear 17 is also a helical gear which is twisted to the left direction. Accordingly, the normal-rotation toothed surface is used for the toothed portions 17t and 18t because it is advantageous for the load of the normal-rotation direction which is caused by high frequency of usage.

It is also arranged so that the gear ratio is appropriately selected and the rear and front hypoid ring gears can be commonly used. This is due to the fact that the direction of rotation of the first axle shaft 7 and that of the transfer shaft 12 can be set in the same direction by the chain type power transmission means. The rear hypoid ring gear 18 is fixed on the peripheral portion of the rear differential gear 19, while the rotation axis of the differential gear 19 is connected to a pair of the rear drive shafts 22, thus enabling the rear-wheel drive.

Figure 2:
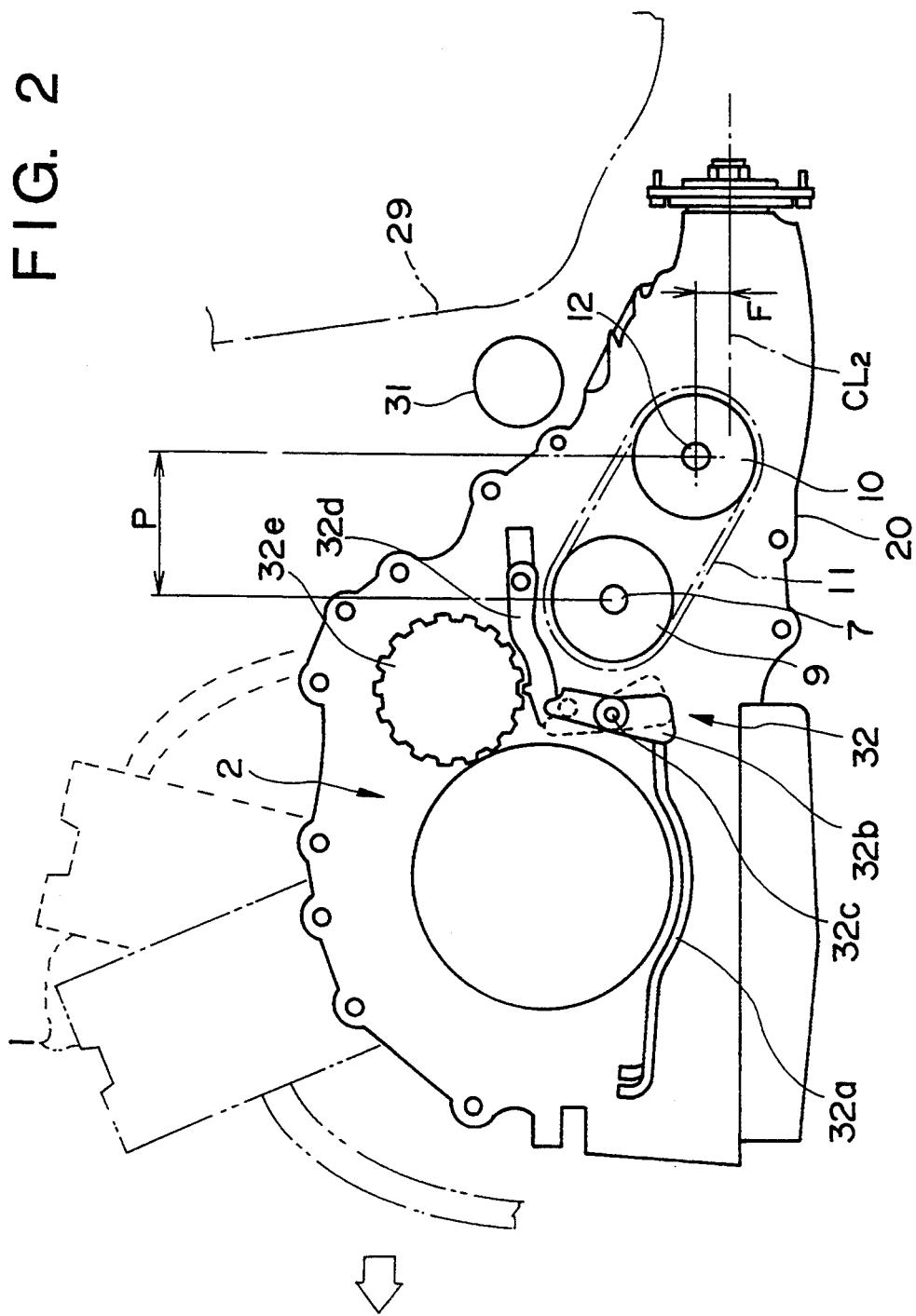
FIG. 2 is a side view from the side where the transmission gear 2 of FIG. 1 is provided.

FIG. 2 is a side view from the transmission 2 of FIG. 1 in the case of an automatic transmission gear. In the figure, the transverse engine 1 can be an in-line type engine where an exhaust pipe extends only to the front of the vehicle or a V-type engine that the exhaust pipe extends both to the front and rear of the vehicle. The automatic transmission gear 2 is provided in-line. A parking mechanism 32 having a member 32d which is engaged with a peripheral groove of the ratchet wheel 32e adjacent to the first axle shaft 7.

The first sprocket 9, fixed with respect to the first axle shaft 7, and the second sprocket 10, fixed with respect to the transfer shaft 12, have a small diameter. The transfer shaft 12 is provided lower than the first axle shaft 7 so as to be compact in size by minimizing the projection distance P onto the plans between each sprocket. While the capacity of the engine space is reduced by connecting with respect the the dash panel 29. The propeller shaft 15 is provided with the axis CL2 as a center which is offset for the distance F below the front hypoid ring gear 13 fixed on the transfer shaft 12.

Accordingly, since the front power transmission gear which is incorporated in the engine 1 is miniaturized by the structure where the transfer shaft 12 is driven by a chain, vibration amplification is prevented in the front power transmission gear while the engine is rotating.

In the power transmission gear of the four-wheel drive, the final gear ratio for driving the front wheels and that for the rear wheels are the same. In other words, when the final gear ratio of the front wheels is set to "1" that of the rear wheels needs to set to "1" The final gear ratio of the rear wheels can be determined by arbitrarily setting each of the number of teeth of the first sprocket and second sprocket which are engaged with the chain, the number of the front hypoid ring gear, the front/rear hypoid pinion gear, and the rear hypoid ring gear, respectively.

FIG. 3 shows a table of the combinations of gear numbers which makes the final gear ratio of the rear wheels to the front wheels "1". The combinations of (I) through (V) are shown as examples. In this table, it is designated that the number of teeth of the second sprocket 10 of the chain portion is $Z_1$; the number of teeth of the first sprocket 9 is $Z_2$; each of the number of teeth of the front and rear hypoid pinion gear 14, 17 is $Z_P$, respectively; the number of teeth of the front hypoid ring gear 13 is $Z_F$, and the number of teeth of the rear hypoid ring gear 18 is $Z_R$. In the table, "$i_1$" is a gear ratio in the chain portion, "$i_2$" is a gear ratio in the four-wheel drive at the vehicle front, and "$i_3$" is a gear ratio in the four-wheel drive at the vehicle rear. Furthermore, " ↑ " means "the same as the above".

In the table, according to the combination of (I) and (II), since the final gear ratio of the rear wheels "1" is obtained by setting $Z_1$, $Z_2$ and $Z_F$, $Z_R$, $Z_P$ so as to be commonly used, it is advantageous for generalization of the gear parts, simplification of the production procedure, and lower cost. In this case, the diameter of the front hypoid ring gear becomes the same as that of the rear hypoid ring gear.

According to the combination of (III) through (V), the final gear ratio "1" is obtained by setting $Z_1$ and $Z_2$ as shown in the table, the value $i_1$ to the value rather than "1" the value $i_2$ to the value shown in the table, respectively. According to the combination of (IV) and (V) in particular, the value $i_3$ can be set to 3,818. Accordingly, the propeller shaft 15 can be rotated at high speed and a clutch of a small capacity can be used when the clutch 16 is provided on the propeller shaft 15. Furthermore, since the diameter of the front hypoid ring gear 13 can be reduced, the front portion of the power transmission gear of the four-wheel vehicle can be compact in size. Still further, since the number of the teeth of $Z_1$ and $Z_2$ is decreased, the front portion of the power transmission gear can be further miniaturized without interfering with the parking mechanism.

Figure 4:
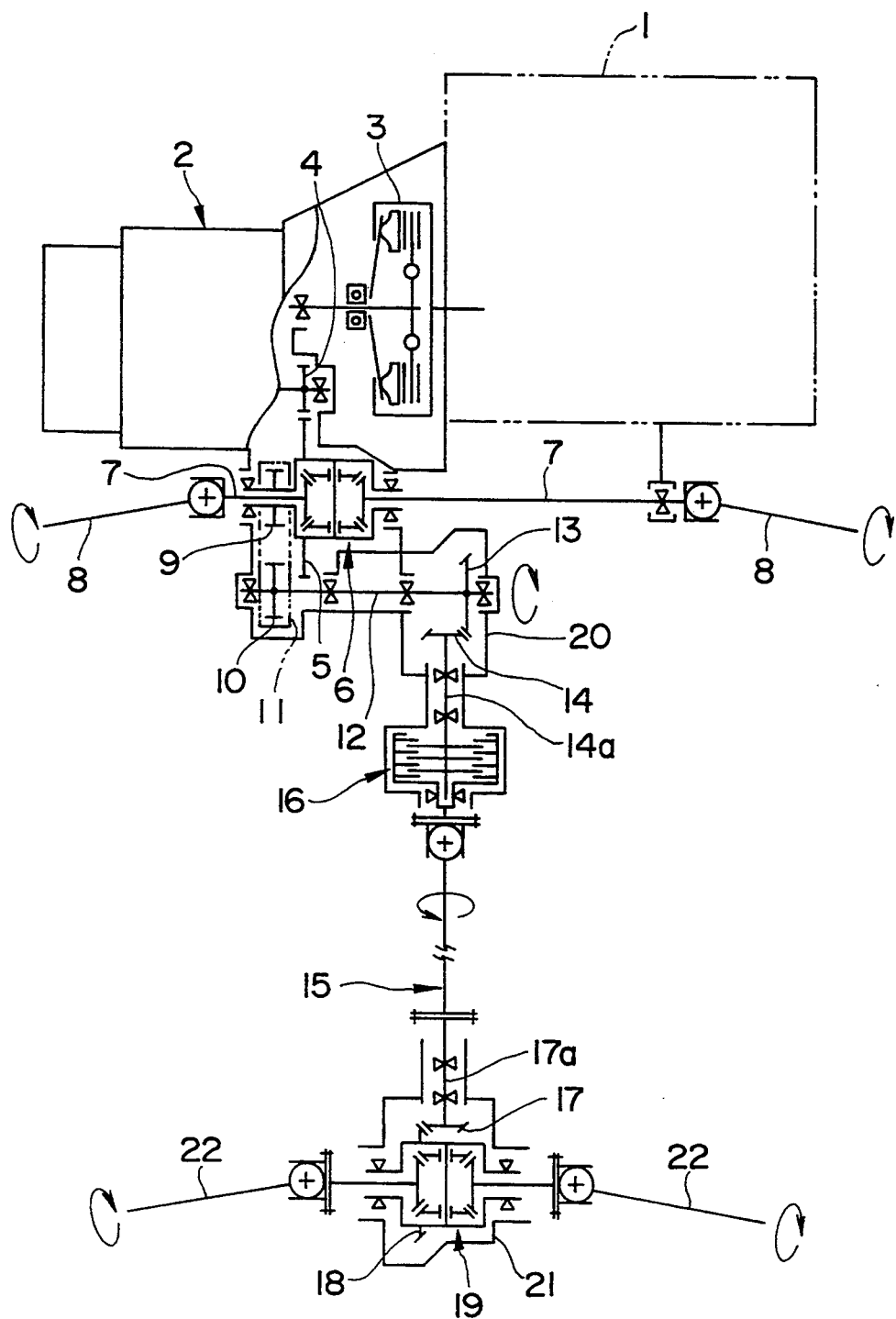
FIG. 4 is a skeleton of the power transmission apparatus of a four-wheel-drive vehicle of a second embodiment.

FIG. 4 is a skeleton of the power transmission gear of the four-wheel-drive vehicle of the second embodiment. In FIG. 4, portions identical with those of FIG. 1 are designated by like reference characters and will not be described here. Only the different portions are described below. One end of the operational member of the clutch 16 is fixed to the shaft 14a of the front hypoid pinion gear 14, while the other end of the operational member of the clutch 16 is fixed to one end of the propeller shaft 15. It is arranged so that the rear wheels are appropriately driven by the operation of the clutch 16. According to the above constitution, the clutch 16 is directly mounted to the front cover 20 for incorporating and supporting the transfer shaft 12.

Figure 5:
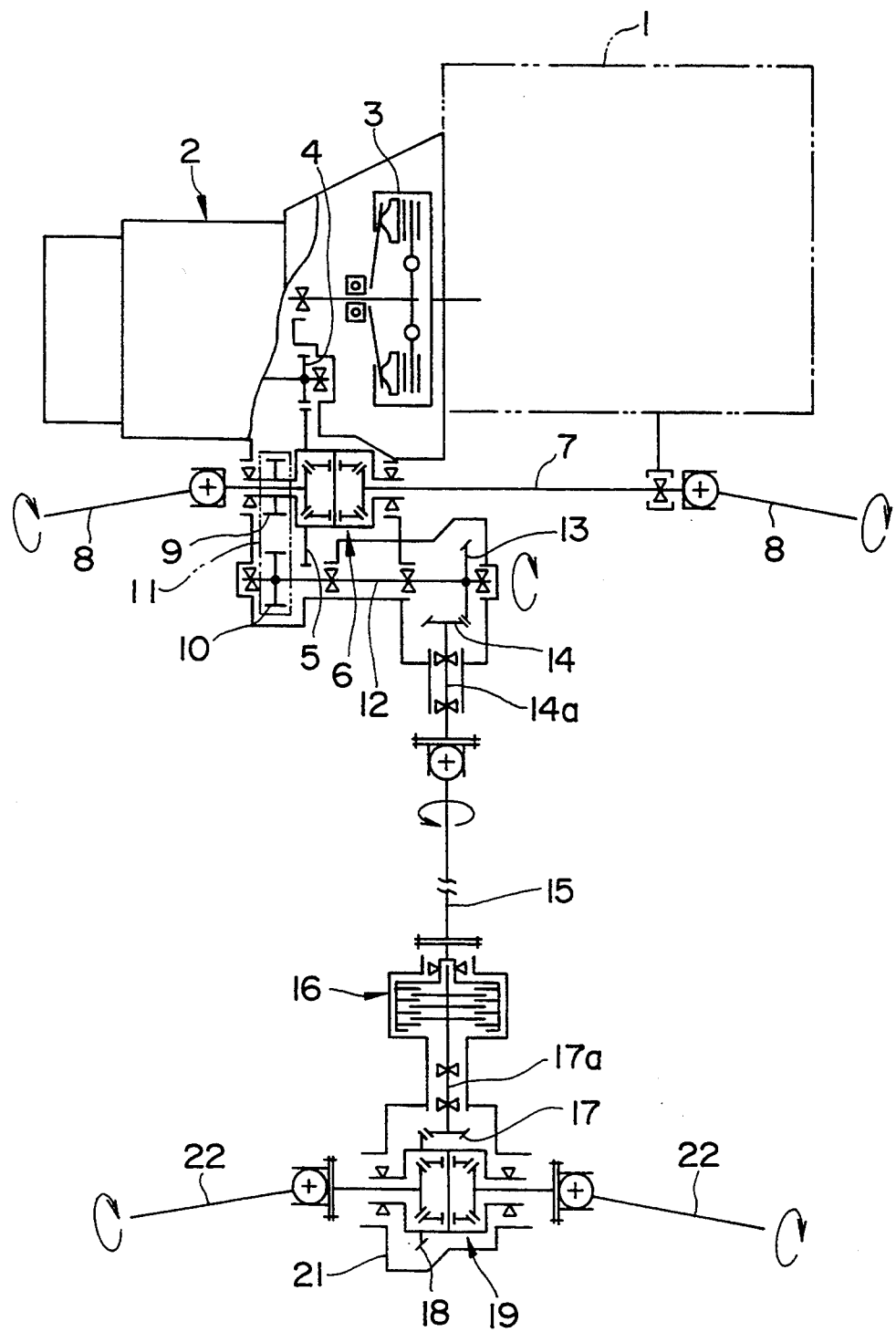
FIG. 5 is a skeleton of the power transmission apparatus of a four-wheel-drive vehicle of a third embodiment.

FIG. 5 is a skeleton of the power transmission gear of the four-wheel-drive vehicle of the third embodiment. In FIG. 5, portions identical with those of FIG. 1 are designated by like reference characters and will not be described here. Only the different portions are described below. One end of the operational member of the clutch 16 is fixed to the shaft 17a of the front hypoid pinion gear 17, while the other end of the operational member of the clutch 16 is fixed to one end of the propeller shaft 15. It is arranged so that the rear wheels are appropriately driven by the operation of the clutch 16. According to the above constitution, since the clutch 16 is directly mounted to the rear cover 21 for the rear-wheel drive, the advantage is that the vehicle weight is equally distributed between the front and rear, which is a principal of the four-wheel-drive vehicle.

Figure 6:
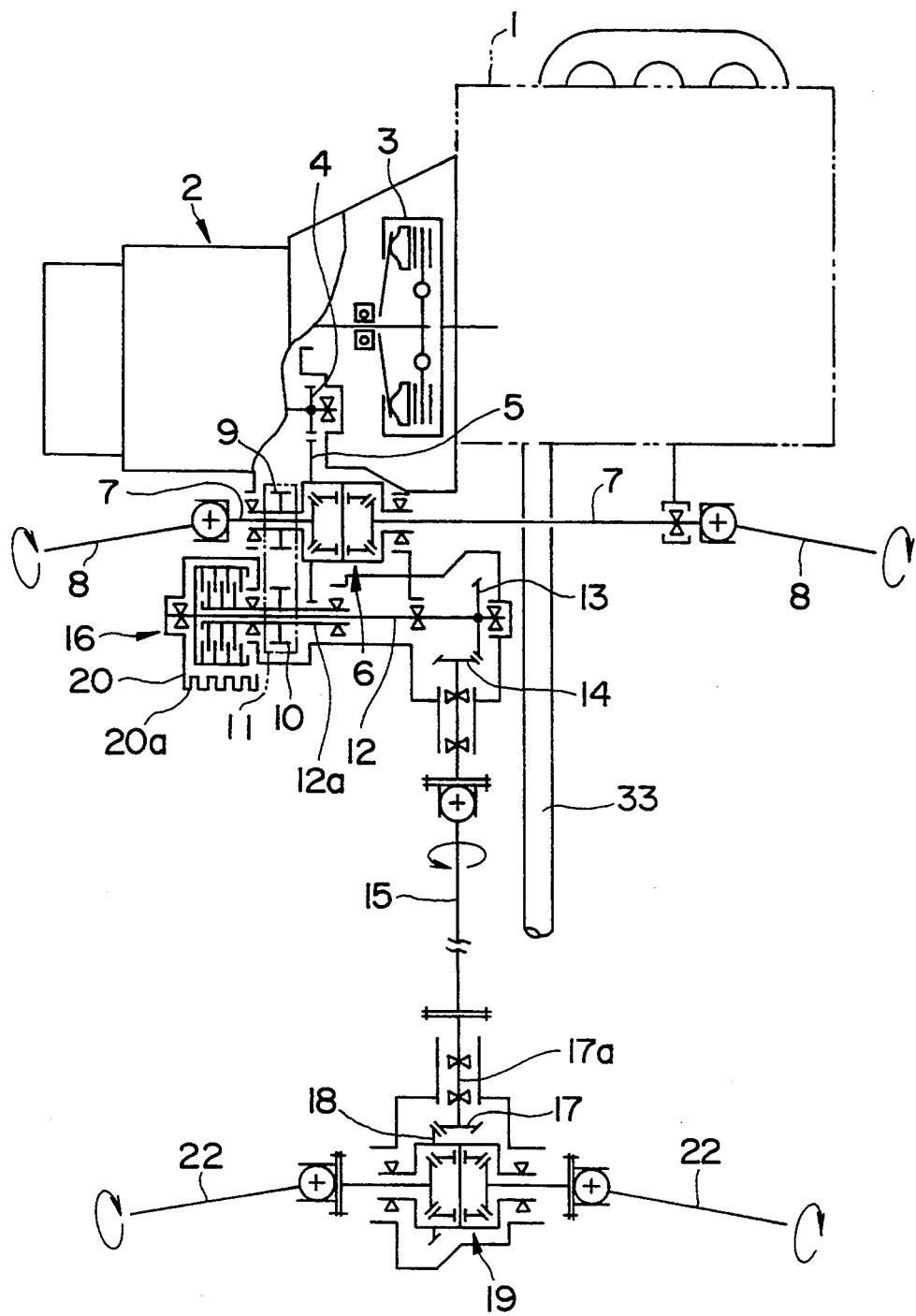
FIG. 6 is a skeleton of the power transmission apparatus of a four-wheel-drive vehicle of a fourth embodiment.

FIG. 6 is a skeleton of the power transmission gear of the four-wheel drive of thee fourth embodiment. In FIG. 6, portions identical with those of FIG. 1 are designated by like reference characters and need not be described. Only the different portions are described below. An exhaust pipe 33 of the engine 1 is provided in parallel to the propeller shaft 15 and shares a part of the tunnel portion of the vehicle floor with the propeller shaft 15. In order to interfere the transfer shaft 12 and the second sprocket 10, an operational member of the second sprocket 10 and the clutch 16 is provided to the rotational member 12a which is provided rotatably with respect to the transfer shaft 12, while the other end of operational member of the clutch 16 is fixed with one end of the transfer shaft 12. It is arranged so that the rear wheels are appropriately driven by the operation of the clutch 16.

According to the above constitution, since the clutch 16 can be provided apart from a heat source as the exhaust pipe 33, this is advantageous when the oil pressure clutch in which heat dependency is rather high is used. For example, it can be arranged such that a radiator 20a can be provided in the casing of the clutch 16 and cooling of the clutch is realized by ventilation. When the automatic transmission gear 2 is used, it can be arranged so that the oil pressure source for the automatic transmission gear can be also used for the oil pressure clutch source. Thus, the pipe can be shortened, resulting in improved responsiveness.

Figure 7:
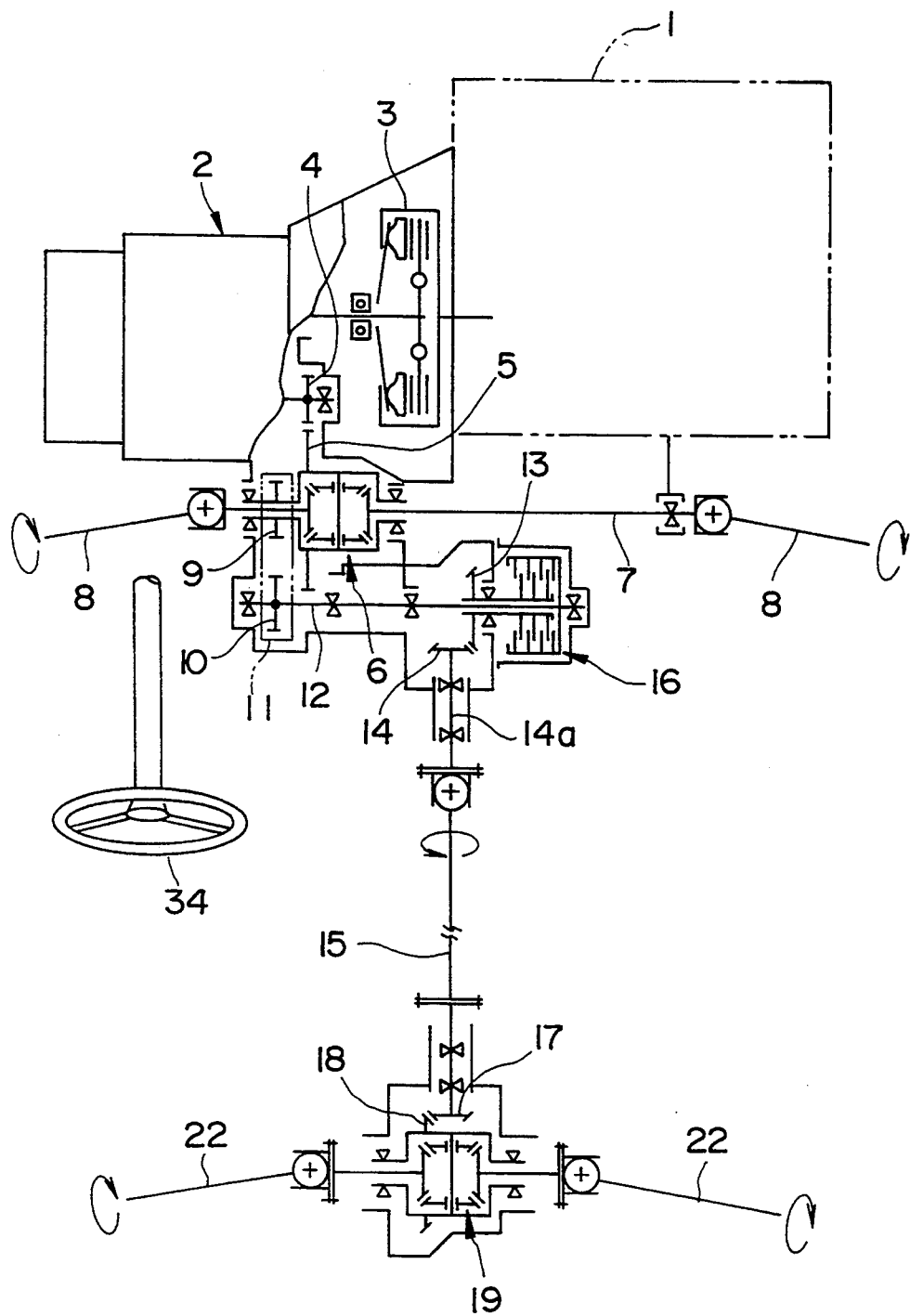
FIG. 7 is a skeleton of the power transmission apparatus of a four-wheel-drive vehicle of a fifth embodiment.

FIG. 7 is a skeleton of the power transmission gear of the four-wheel-drive vehicle of the fifth embodiment. In FIG. 7, portions identical with those of FIG. 1 are designated by like reference characters and will not be described here. Only the different portions are described below. The clutch 16 is mounted at the right end portion of the transfer shaft 12. As shown in the figure, the left-handle steering 34 is provided, and it is arranged so that the clutch does not interrupt the steering apparatus (i.e., comprising a rack and pinion) provided in the left-handle steering 34.

Figure 8:
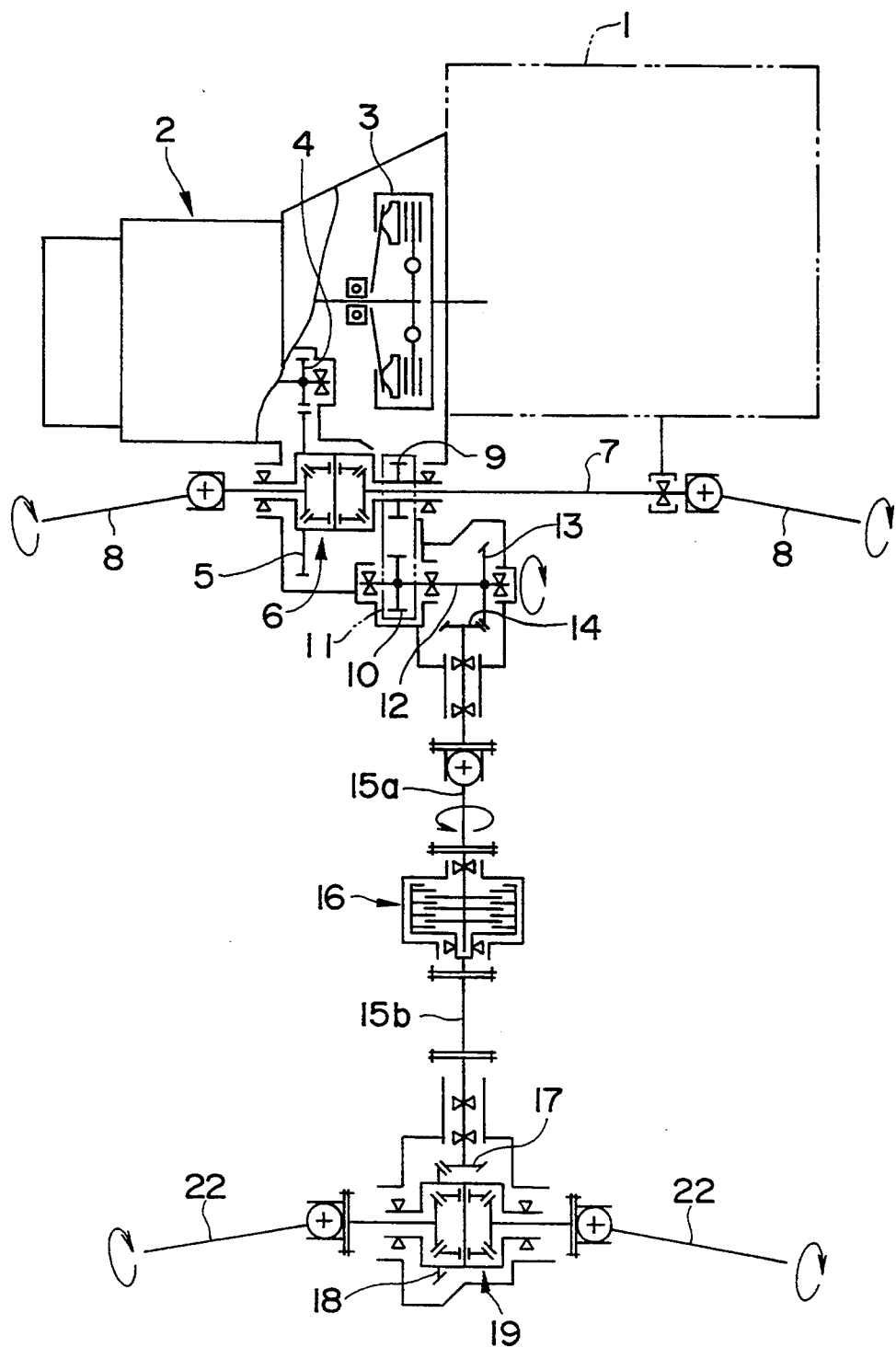
FIG. 8 is a skeleton of the power transmission apparatus of a four-wheel-drive vehicle of a sixth embodiment.

FIG. 8 is a skeleton of the power transmission gear of the four-wheel-drive vehicle of the sixth embodiment. In FIG. 8, portions identical with those of FIG. 1 are designated by like reference characters and will not be described here. Only the different portions are described below. In FIG. 8, the chain 11 is stretched between the first sprocket 9 fixed on the peripheral portion of the right side of the front differential gear 6 and the second sprocket 10 fixed on the left side of the transfer shaft 12. Advantages which are similar to the above-described ones can be obtained from this construction.

Figure 9:
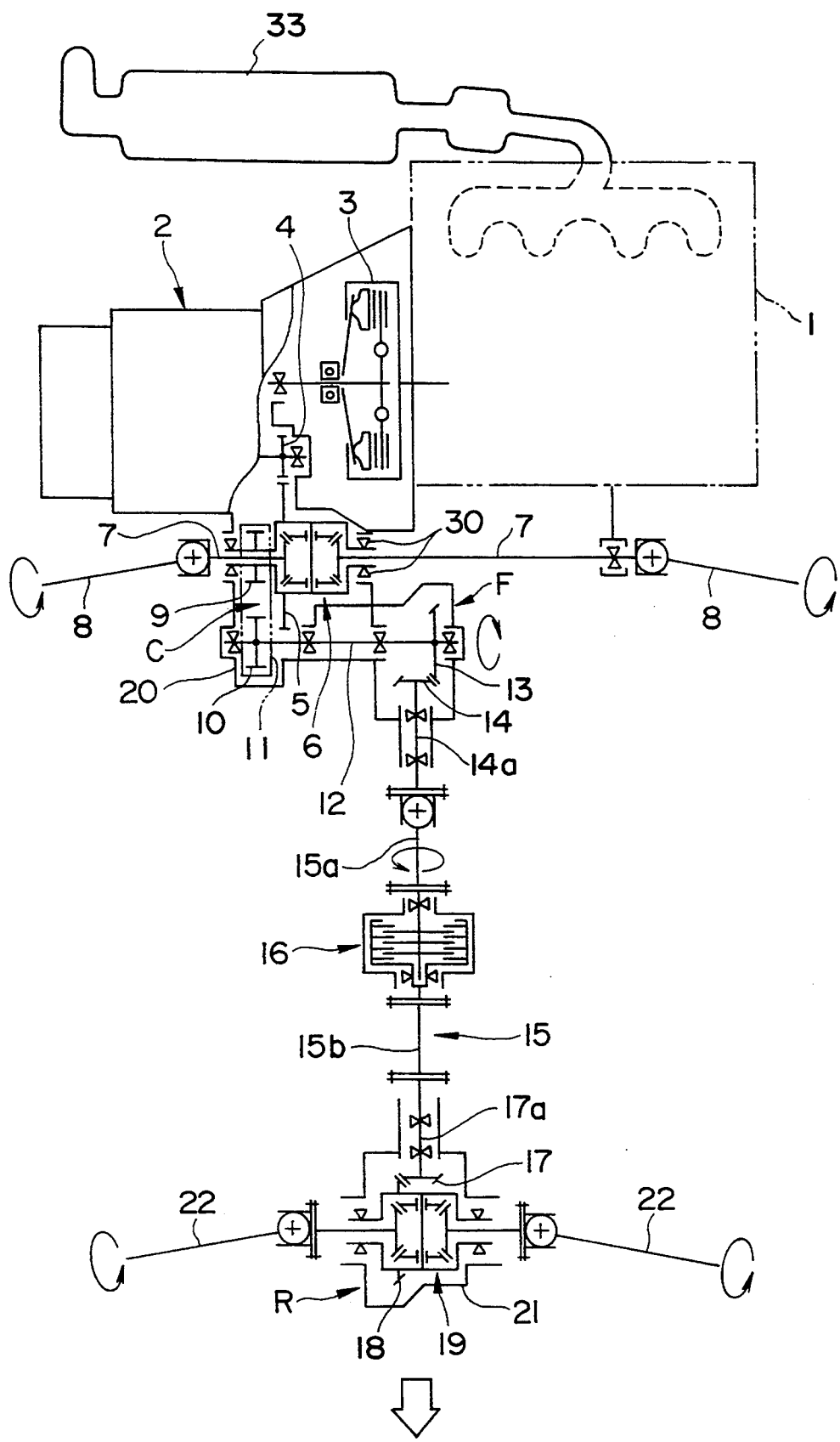
FIG. 9 is a skeleton of the power transmission apparatus of a four-wheel-drive vehicle of a seventh embodiment.
Figure 10:
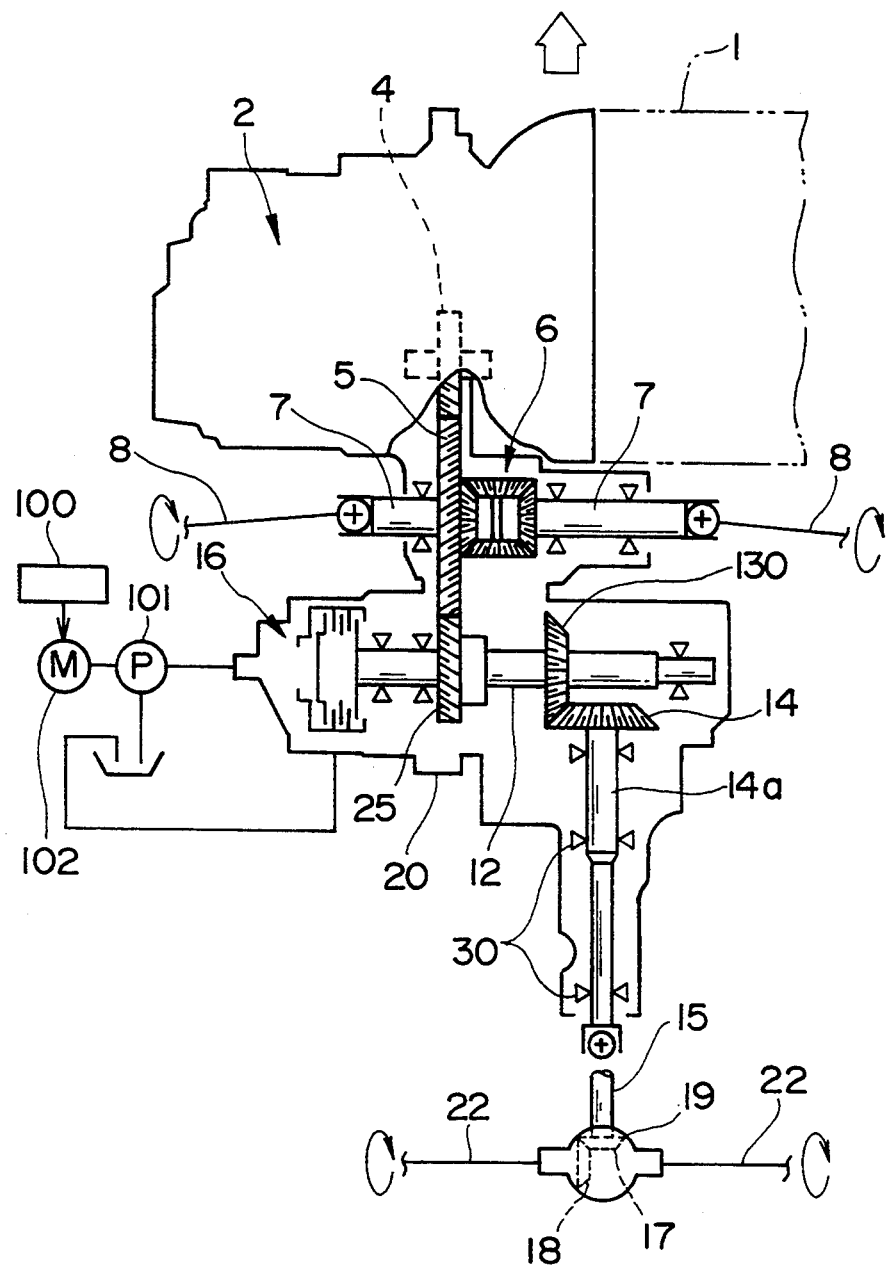
FIG. 10 shows the prior art and a partial view based on the Japanese Patent Provisional Publication.

Finally, FIG. 9 is a skeleton of the power transmission gear of the four-wheel-drive vehicle of the seventh embodiment. In FIG. 9, portions identical with those of FIG. 1 are designated by like reference characters and need not be described. Only the different portions are described below. In FIG. 9, the engine 1 is provided at the vehicle rear and the four-wheel drive based on RR is constituted. Therefore, the exhaust pipe 33 is provided so as to extend to the rear direction of the engine 1. The first axle shaft 7 is provided to drive the rear wheels constantly. Further, the second axle shafts 22 which drive the front wheels are provided as shown the figure and it is arranged so that it is appropriately intermitted by the clutch 16.

According to the above constitution, it can be provided a four-wheel-drive vehicle of the rear engine base by the engine 1 which is provided at the vehicle rear and is applicable to the case where a rear engine space is small.

The present invention is not limited to the above embodiments. For example, it is applicable to a normal bevel gear instead of the hypoid ring gear and hypoid pinion gear comprising the hypoid gear. As many apparently widely different embodiments of the present invention can be made without departing from the spirit and scope thereof. For example, the most appropriate design considering the manufacturing procedure and durability can be obtained by combining each embodiment. Particularly, instead of actively controlling the oil pressure or magnetic type clutch, a so called "passive torque split type power transmission apparatus"

can be constituted by using a viscous coupling which does not transmit a sudden torque change. Furthermore, instead of the chain and sprockets, a belt and pulleys structure can be adopted for the power transmission means and the engine can be provided in the vehicle rear.

As many apparently widely different embodiments of the present invention can be made without departing from the spirit and scope thereof, it is to be understood that the invention is not limited to the specific embodiments thereof except as defined in the appended claims.

What is claimed is:

1. A power transmission apparatus for a four-wheel-drive vehicle comprising:
   a transverse engine provided in one of the front and rear of the vehicle and having an output shaft provided in a direction of the vehicle width;
   a transmission device provided substantially in-line with the transverse engine and having an output shaft, the output shaft of the transmission device being substantially parallel to the output shaft of the engine;
   power transmission means provided with respect to said transmission device, for driving at least one of front wheels and rear wheels, and having a clutch means for variably controlling driving torque division for the wheels not being driven;
   an axle shaft to drive the wheels by obtaining a driving force from the output shaft of the transmission device, the axle shaft being provided in parallel to the output shaft of the transmission device;
   a transfer shaft provided in parallel with the axle shaft;
   power transmission means, comprising a first sprocket fixed on the axle shaft, a second sprocket fixed on the transfer shaft and a chain stretched between the first sprocket and the second sprocket, for performing power transmission so that the transfer shaft and the axle shaft will have the same direction of rotation;
   a first ring bevel gear having a toothed surface, the first ring bevel gear fixed on the transfer shaft;
   a first pinion bevel gear engaged with the first ring bevel gear;
   a propeller shaft, one end connected to said first pinion bevel gear and the other end connected to a second pinion bevel gear; and
   a second ring bevel gear having a toothed surface, the toothed surface of the second ring bevel gear facing the toothed surface of the first ring bevel gear and engaging with the second pinion bevel gear.

2. A power transmission apparatus for a four-wheel drive vehicle comprising:
   a transverse engine provided in the front of the vehicle, said transverse engine including an output shaft provided in a direction of the vehicle width;
   a transmission device provided substantially in-line with the transverse engine and having an output shaft, the output shaft of the transmission device being substantially parallel to the output shaft of the engine;
   power transmission means provided with respect to said transmission device, for providing driving torque to the front wheels, and having clutch means for variably controlling driving torque division to the rear wheels not being driven;
   an axle shaft to drive the wheels by obtaining a driving force from the output shaft of the transmission device, the axle shaft being provided in parallel to the output shaft of the transmission device;
   a transfer shaft provided in parallel with the axle shaft;
   power transmission means comprised of a first sprocket fixed on the axle shaft a second sprocket fixed On the transfer shaft, and a chain stretched between the first sprocket and second sprocket, for performing power transmission so that the transfer shaft and the axle shaft will have the same direction of rotation;
   a first ring bevel gear fixed on said transfer shaft, said first ring bevel gear having a toothed surface;
   a first pinion bevel gear engaged with the first ring bevel gear;
   a propeller shaft, one end connected to said first pinion bevel gear and the other end connected to a second pinion bevel gear; and
   a second ring bevel gear having a toothed surface, the toothed surface of the second ring bevel gear facing the toothed surface of said first ring bevel gear and engaging with said second pinion bevel gear.

3. The power transmission apparatus according to claim 2, wherein the first ring bevel gear and the second ring bevel gear are hypoid ring gears; and
   the first pinion bevel gear and the second pinion bevel gear are hypoid pinion gears,
   the axis of rotation of the hypoid pinion gear is provided by off-setting for a predetermined distance downward with respect to the axis of rotation of the hypoid ring gear in the vehicle body.

4. The power transmission apparatus according to claim 2, wherein a number of teeth of the first sprocket of the power transmission means is $Z_1$, a number of teeth of the second sprocket is $Z_2$, a number of teeth of the first ring bevel gear is $Z_F$, a number of teeth of the first pinion bevel gear and the second pinion bevel gear is respectively $Z_P$, a number of teeth of the second ring bevel gear is $Z_R$, a declaration ratio $Z_1/Z_2$, $Z_P/Z_F$, $Z_R/Z_P$ is appropriately set, and a final deceleration ratio determined from $Z_1/Z_2 \cdot Z_P/Z_F \cdot Z_R/Z_P$ is set to "1".

5. The power transmission apparatus according to claim 4, wherein the deceleration ratio $Z_1/Z_2$ is set to less than "1", the number of teeth $Z_F$ of the first ring bevel gear is set to a smaller value, the deceleration ratio $Z_P/Z_F \cdot Z_R/Z_P$ are appropriately set, and the final deceleration ratio "1" is determined.

6. The power transmission apparatus according to claim 2, wherein said power transmission means is provided apart from the rear of said transverse engine.

7. The power transmission apparatus according to claim 2, wherein the clutch means is provided in a predetermined portion of the propeller shaft.

8. The power transmission apparatus according to claim 2, wherein said clutch means is provided in a predetermined portion on said transfer shaft.

9. The power transmission apparatus according to claim 2 wherein said clutch means is provided in the transfer shaft side on said propeller shaft.

10. The power transmission apparatus according to claim 2, wherein the clutch means is provided at the substantially center of the propeller shaft.

11. The power transmission apparatus according to claim 2, wherein the clutch means is provided adjacent to the second ring bevel gear side on the propeller shaft.

12. The power transmission apparatus according to claim 2, wherein said clutch means is provided on one end of the transfer shaft so as to be apart from said transverse engine.

13. The power transmission apparatus according to claim 2, wherein said clutch means is provided adjacent to said first ring bevel gear.

14. A power transmission apparatus for a four-wheel-drive vehicle comprising:
- a transverse engine provided in the front of the vehicle, and having an output shaft provided in a direction of the vehicle width;
- a transmission device provided substantially in-line with said transverse engine and having an output shaft, the output shaft of the transmission device being substantially parallel to the output shaft of the engine;
- power transmission means provided with respect to said transmission device, for driving the front wheels, and having clutch means for variably controlling driving torque division for the rear wheels not being driven;
- an axle shaft to drive the front wheels by obtaining a driving force from the output shaft of the transmission device, the axle shaft being provided in parallel to the output shaft of the transmission device;
- a transfer shaft provided in parallel with the axle shaft;
- power transmission means for performing power transmission, comprised of a first sprocket fixed on the transfer shaft, a second sprocket fixed on the axle shaft, and a chain stretched between the first sprocket and the second sprocket;
- a first hypoid ring bevel gear fixed on said transfer shaft, said first hypoid ring bevel gear having a toothed surface;
- a first hypoid pinion bevel gear engaged with the first hypoid ring bevel gear;
- a propeller shaft, one end connected to said first hypoid pinion bevel gear and the other end connected to a second hypoid pinion bevel gear; and
- a second hypoid ring bevel gear having a toothed surface, said toothed surface of said second hypoid ring bevel gear facing the toothed surface of said first hypoid ring bevel gear and engaging with said second hypoid pinion bevel gear.

15. The power transmission apparatus according to claim 14, wherein a number of teeth of the first sprocket of the power transmission means is $Z_1$, a number of teeth of the second sprocket is $Z_2$, a number of teeth of the first hypoid ring bevel gear is $Z_F$, a number of teeth of the first hypoid pinion bevel gear and the second hypoid pinion bevel gear is respectively $Z_P$, a number of teeth of the second hypoid ring bevel gear is $Z_R$, a deceleration ratio $Z_1/Z_2$, $Z_P/Z_F$, $Z_R/Z_P$ is appropriately set, and a final deceleration ratio determined from $Z_1/Z_2 \cdot Z_P/Z_F \cdot Z_R/Z_P$ is set to "1".

16. The power transmission apparatus according to claim 15, wherein said clutch means is provided on said propeller shaft.

17. The power transmission apparatus according to claim 15, wherein the deceleration ratio $Z_1/Z_2$ is set less than "1", the number of teeth $Z_F$ of the first hypoid ring bevel gear is set to a small value, the deceleration ratio $Z_P/Z_F \cdot Z_R/Z_P$ are appropriately set, and the final deceleration ration "1" is determined.

18. A power transmission apparatus for a four-wheel-drive vehicle comprising:
- a transverse engine provided in the rear of a vehicle and having an output shaft extensively provided in a direction of the vehicle width;
- a transmission device provided substantially in-line with the transverse engine and having an output shaft the output shaft of the transmission device being substantially parallel to the output shaft of the engine;
- power transmission means provided with respect to said transmission device, for driving the rear wheels, and having clutch means for variably controlling driving torque division to the front wheels not being driven;
- an axle shaft to drive the front wheels by obtaining a driving force from the output shaft of the transmission device and being provided in parallel to the output shaft of the transmission device;
- a transfer shaft provided in parallel with the axle shaft;
- power transmission means, comprising a first sprocket fixed on the axle shaft, a second sprocket fixed on the transfer shaft, and a chain stretched between the first sprocket and the second sprocket, for performing power transmission so that the transfer shaft and axle shaft will have the same direction of rotation;
- a first ring bevel gear fixed on said transfer shaft, said first ring bevel gear having a toothed surface;
- a first pinion bevel gear which is engaged with the first ring bevel gear;
- a propeller shaft, one end connected to said first pinion bevel gear and the other end connected to a second pinion bevel gear; and
- a second ring bevel gear having a toothed surface the toothed surface of the second ring bevel gear facing the toothed surface of the first ring bevel gear and engaging with the second pinion bevel gear.

* * * * *